United States Patent
Rodrigues et al.

(10) Patent No.: US 10,558,619 B2
(45) Date of Patent: Feb. 11, 2020

(54) DETECTION OF BULK OPERATIONS ASSOCIATED WITH REMOTELY STORED CONTENT BY CLIENT DEVICE

(71) Applicant: MICROSOFT TECHNOLOGY LICENSING, LLC, Redmond, WA (US)

(72) Inventors: John D. Rodrigues, Woodinville, WA (US); Steven Bailey, Bellevue, WA (US); Andrew Glover, Duvall, WA (US); Filip Chelarescu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 531 days.

(21) Appl. No.: 15/238,934

(22) Filed: Aug. 17, 2016

(65) Prior Publication Data

US 2018/0039654 A1  Feb. 8, 2018

Related U.S. Application Data

(63) Continuation of application No. 15/230,580, filed on Aug. 8, 2016.

(51) Int. Cl.
*G06F 17/00* (2019.01)
*G06F 16/178* (2019.01)
(Continued)

(52) U.S. Cl.
CPC ......... *G06F 16/178* (2019.01); *G06F 16/119* (2019.01); *G06F 16/162* (2019.01); *G06F 16/1734* (2019.01)

(58) Field of Classification Search
None
See application file for complete search history.

(56) References Cited

U.S. PATENT DOCUMENTS 6,336,175 B1   1/2002  Shaath et al.
7,143,092 B1  11/2006  Gregorat
(Continued)

FOREIGN PATENT DOCUMENTS

CN   105072135 A    11/2015
WO   2006114723 A2  11/2006

OTHER PUBLICATIONS

"Final Office Action Issued in U.S. Appl. No. 15/226,966", dated Oct. 5, 2018, 27 Pages.
(Continued)

*Primary Examiner* — Hung D Le
(74) *Attorney, Agent, or Firm* — Michael Best & Friedrich LLP

(57) ABSTRACT

Cloud-based storage services are provided for storing and/or sharing content across multiple devices, where the content is periodically synchronized between the devices and the storage service. Embodiments are directed to detection of bulk operations associated with content stored at a storage service to protect users both proactively and remedially from accidental and/or nefarious content alterations propagating to the storage service and/or other devices. A model based on a usage pattern monitored and provided by a client device may be received at the client device from the storage service. An attempted operation performed on the content may be detected, and the attempted operation may be compared to the model to determine whether the operation deviates from the usage pattern. If the attempted operation deviates from the usage pattern, execution of the attempted operation and synchronization of the content with the storage service may be prevented until the attempted operation is approved.

18 Claims, 10 Drawing Sheets

(51) Int. Cl.
  *G06F 16/11* (2019.01)
  *G06F 16/16* (2019.01)
  *G06F 16/17* (2019.01)

(56) References Cited

U.S. PATENT DOCUMENTS

| | | | |
|---|---|---|---|
| 7,231,598 B1 | 6/2007 | Sawicki et al. | |
| 7,363,330 B1 | 4/2008 | Ellman et al. | |
| 7,962,950 B2 | 6/2011 | Choo et al. | |
| 8,255,366 B1 | 8/2012 | Bagley et al. | |
| 8,453,215 B1 | 5/2013 | LeBert | |
| 8,504,532 B2 | 8/2013 | Saxena et al. | |
| 8,819,208 B2 | 8/2014 | Wright | |
| 8,856,256 B1 | 10/2014 | Srinivasan | |
| 8,856,542 B2 | 10/2014 | Tatarinov et al. | |
| 8,918,863 B1 | 12/2014 | Pendse | |
| 9,037,825 B1 | 5/2015 | Donlan et al. | |
| 9,237,170 B2 | 1/2016 | Kiang et al. | |
| 9,292,687 B2 | 3/2016 | Thure et al. | |
| 9,317,686 B1 | 4/2016 | Ye et al. | |
| 9,912,752 B1 | 3/2018 | Davis et al. | |
| 2002/0194177 A1 | 12/2002 | Sherman et al. | |
| 2004/0068523 A1 | 4/2004 | Keith et al. | |
| 2004/0107199 A1 | 6/2004 | Dalrymple, III et al. | |
| 2004/0186858 A1 | 9/2004 | Mcgovern et al. | |
| 2005/0114412 A1 | 5/2005 | Gerhard | |
| 2006/0200623 A1 | 9/2006 | Gonzalez et al. | |
| 2007/0044020 A1 | 2/2007 | Iwatsu et al. | |
| 2007/0070218 A1 | 3/2007 | Meijer et al. | |
| 2008/0091944 A1* | 4/2008 | von Mueller | G06Q 20/085 713/168 |
| 2008/0228578 A1 | 9/2008 | Mashinsky | |
| 2010/0030819 A1 | 2/2010 | Srinivasan et al. | |
| 2010/0197383 A1* | 8/2010 | Rader | G06F 21/105 463/25 |
| 2010/0312944 A1* | 12/2010 | Walker | G06F 12/0215 711/5 |
| 2011/0007076 A1 | 1/2011 | Nielsen et al. | |
| 2013/0074193 A1 | 3/2013 | Baker | |
| 2013/0144845 A1 | 6/2013 | Ghuge et al. | |
| 2013/0151658 A1 | 6/2013 | Baker et al. | |
| 2013/0198521 A1 | 8/2013 | Wu | |
| 2013/0244423 A1 | 9/2013 | Kolics | |
| 2014/0019497 A1 | 1/2014 | Cidon et al. | |
| 2014/0082749 A1 | 3/2014 | Holland et al. | |
| 2014/0095727 A1 | 4/2014 | Evans et al. | |
| 2014/0172799 A1 | 6/2014 | Dorman | |
| 2014/0181057 A1 | 6/2014 | Euresti et al. | |
| 2014/0188808 A1 | 7/2014 | Wolf et al. | |
| 2014/0258350 A1 | 9/2014 | Duval et al. | |
| 2014/0279498 A1* | 9/2014 | Qaim-Maqami | G06Q 20/4014 705/44 |
| 2014/0310769 A1 | 10/2014 | O'neill et al. | |
| 2014/0337291 A1 | 11/2014 | Dorman et al. | |
| 2014/0359085 A1 | 12/2014 | Chen | |
| 2014/0372382 A1 | 12/2014 | Hrebicek et al. | |
| 2015/0234612 A1* | 8/2015 | Himelstein | G06F 13/00 714/6.21 |
| 2015/0248384 A1 | 9/2015 | Luo et al. | |
| 2015/0248631 A1* | 9/2015 | Brown | G06Q 10/06316 705/7.26 |
| 2015/0312422 A1* | 10/2015 | Leemet | H04L 41/082 455/406 |
| 2015/0347552 A1 | 12/2015 | Habouzit et al. | |
| 2016/0004882 A1 | 1/2016 | Ballai et al. | |
| 2016/0006791 A1 | 1/2016 | Ladiwala | |
| 2016/0019233 A1 | 1/2016 | Wijayaratne et al. | |
| 2016/0026455 A1 | 1/2016 | Jeffrey et al. | |
| 2016/0041972 A1 | 2/2016 | Lehmann et al. | |
| 2016/0162374 A1 | 6/2016 | Mutha et al. | |
| 2016/0267404 A1* | 9/2016 | Shicoff | G06Q 10/025 |
| 2016/0380937 A1 | 12/2016 | Murphy et al. | |
| 2017/0063906 A1* | 3/2017 | Muddu | G06F 16/9024 |
| 2017/0228675 A1 | 8/2017 | Kisin et al. | |
| 2018/0039551 A1 | 2/2018 | Rodrigues et al. | |
| 2018/0039686 A1 | 2/2018 | Rodrigues et al. | |
| 2018/0054432 A1 | 2/2018 | Bailey et al. | |
| 2018/0054480 A1 | 2/2018 | Bailey et al. | |
| 2019/0258605 A1 | 8/2019 | Ballai et al. | |

OTHER PUBLICATIONS

"Non Final Office Action Issued in U.S. Appl. No. 15/230,580", dated Oct. 15, 2018, 12 Pages.

"Final Office Action Issued in U.S. Appl. No. 15/241,116", dated Nov. 5, 2018, 22 Pages.

"Non Final Office Action Issued in U.S. Appl. No. 15/226,966", dated Mar. 8, 2019, 29 Pages.

"Final Office Action Issued in U.S. Appl. No. 15/230,580", dated Mar. 21, 2019, 11 Pages.

"Non Final Office Action Issued in U.S. Appl. No. 15/240,004", dated Mar. 8, 2019, 26 Pages.

"Non Final Office Action Issued in U.S. Appl. No. 15/241,116", dated Mar. 6, 2019, 18 Pages.

"Bulk Deleting Per-Job Screening Questions", Retrieved on: Jun. 2, 2016 Available at: https://icimshub.force.com/customer/articles/How_To/Bulk-Deleting-Per-Job-Screening-Questions.

Blessings, Candace, "Cannot delete "all" messages . . . keep getting a Bulk Delete message", Published on: Mar. 5, 2016 Available at: https://productforums.google.com/forum/#!topic/gmail/mMcG9PNPql.

Thomas, Peter, "Detecting High Volume Copy Operations on Windows File Systems with LT Auditor+ 2013", Published on: Jan. 14, 2016 Available at: http://bluelance.com/blog-posts/detecting-high-volume-copy-operations-on-windows-file-systems-with-lt-auditor-2013.

"Bulk delete", Retrieved on: Jun. 2, 2016 Available at: ittps://help.podio.com/hc/en-us/articles/201019808-Bulk-delete.

Tanous, Jim, "Why Amazon Cloud Drive Won't Replace Dropbox or OneDrive", Published on: Mar. 31, 2015 Available at: https://www.tekrevue.com/amazon-cloud-drive-ed/.

"The Ideal Dropbox Setup for External Hard Drives", Published on: Feb. 23, 2015 Available at: https://approductive.wordpress.com/2015/02/23/the-ideal-dropbox-setup-for-external-hard-drives/.

"International Search Report and Written Opinion Issued in PCT Application No. PCT/US2017/044273", dated Sep. 27, 2017, 12 Pages.

"5 Security Features Missing from Consumer-Grade File Sync", Retrieved from: http://www.efolder.net/blog/5-security-features-missing-from-consumer-grade-file-sync/, Aug. 14, 2015, 3 pages.

"Biba Model—Wikipedia, the Free Encyclopedia", Retrieved from: https://en.wikipedia.org/wiki/Biba_Model, Jul. 2, 2017, 3 Pages.

"Create Files and Folder but prevent Deletion and Modification", Retrieved from http://superuser.com/questions/745923/ntfs-permissions-create-files-and-folder-but-prevent-deletion-and-modification, May 9, 2014, 2 pages.

"Cryptolocker: What is and How to Avoid it", Retrieved from: https://www.pandasecurity.com/mediacenter/malware/cryptolocker/, May 14, 2015, 8 Pages.

"How to Stop Malware from Spreading through Cloud?", Retrieved from: https://storageservers.wordpress.com/2016/03/04/how-to-stopmalware-from-spreading-through-cloud-2/, Mar. 4, 2016, 2 Pages.

"Launching File Cloud 9.0-Encryption at Rest, Two Factor Authentication, File Locking, Real Time Network Share Sync, Network Share Recycle Bin, Multi-tenant site management and more", Retrieved from: https://web.archive.org/web/20150515231619/https://www.getfilecloud.com/blog/2015/05/launching-filecloud-9-0-encryption-at-rest-two-factor-authentication-file-locking-real-time-network-share-sync-network-share-recycle-bin-multi-tenant-site-management-and-more/, May 11, 2015, 7 Pages.

"My Files Were Corrupted or Renamed by Ransomware. What can I do?", Retrieved from: https://www.dropbox.com/en/help/8408, Retrieved on: Oct. 21, 2016, 4 Pages.

"Virus Encrypted all Google Drive Files-Cryptolocker Virus", Retrieved from: https://productforums.google.com/forum/#!msg/drive/DmZKolcAPzg/siCsN_IZDIJ, Jun. 3, 2016, 4 Pages.

(56) References Cited

OTHER PUBLICATIONS

"Non Final Office Action Issued in U.S. Appl. No. 15/226,966", dated May 18, 2018, 20 Pages.
"Non-Final Office Action Issued in U.S. Appl. No. 15/241,116", dated Apr. 19, 2018, 23 Pages.
Callahan, Jane, "12 Advanced Dropbox Features That You Should Start Using", Retrieved from https://zapier.com/blog/dropbox-hidden-features/, Jun. 23, 2015, 17 Pages.
Chris, Hoffman, "How to Never Lose Files Stored in Dropbox and Other File-Syncing Services", Retrieved from: https://www.howtogeek.com/219299/ensure-youll-never-lose-files-stored-in-dropbox-and-other-file-syncing-services/, Jun. 13, 2015, 5 Pages.
Dewolf, John, "5 Tips to Secure Google Drive", Retrieved from: https://www.backupify.com/blog/5-tips-to-secure-google-drive, Aug. 4, 2012, 6 Pages.
Han, et al., "MetaSync: Coordinating Storage across Multiple File Synchronization Services", In Journal of IEEE Internet Computing, vol. 20, Issue 3, May 1, 2016, pp. 36-44.
Hassancasa, "Decrypt and remove Teslacrypt 3.0 mp3 files", Retrieved from: https://forum.eset.com/topic/7435-decrypt-and-remove-teslacrypt-30-mp3-files/, Feb. 14, 2016, 15 Pages.
Kleczynski, Marcin, "Introducing the Malwarebytes Anti-Ransomware Beta", Retrieved from: https://blog.malwarebytes.org/malwarebytesnews/2016/01/introducing-the-malwarebytes-anti-ransomware-beta/, Jan. 25, 2016, 7 Pages.
Klein, Matt, "How to Save Drive Space by Offloading Local Files to the Cloud", Retrieved from: https://www.howtogeek.com/199099/save-drive-space-by-offloading-local-files-to-the-cloud/, Oct. 20, 2014, 8 Pages.
Nathan, "CryptoMonitor—Stop All Known Crypto-Ransomware Before It Encrypts Your Data", Retrieved from: https://www.bleepingcomputer.com/forums/t/572146/cryptomonitor-stop-all-known-crypto-ransomware-before-it-encrypts-your-data/, Apr. 3, 2015, 7 Pages.
"International Search Report and Written Opinion Issued in PCT Application No. PCT/US2017/043821", dated Nov. 8, 2017, 15 Pages.
"International Search Report and Written Opinion Issued in PCT Application No. PCT/US2017/046182", dated Oct. 18, 2017, 14 Pages.
"International Search Report and Written Opinion Issued in PCT Application No. PCT/US2017/046672", dated Nov. 2, 2017, 13 Pages.
Pena, Alexs, "How to Deal with Ransomware", Retrieved from: https://blogs.technet.microsoft.com/office365security/how-to-deal-with-ransomware/, Apr. 6, 2016, 10 Pages.
Ramasubramanian, et al., "Cimbiosys: A Platform for Content-based Partial Replication", In Proceedings of the 6th USENIX Symposium on Networked Systems Design and Implementation, Apr. 22, 2009, pp. 261-276.
Riva, et al., "Policy Expressivity in the Anzere Personal Cloud", In Proceedings of the 2nd ACM Symposium on Cloud Computing, Oct. 26, 2011, 14 Pages.
"Non Final Office Action Issued in U.S. Appl. No. 15/238,869", dated Jun. 24, 2019, 12 Pages.
"Notice of Allowance Issued in U.S. Appl. No. 15/230,580", dated Sep. 5, 2019, 9 Pages.
"Non-Final Office Action Issued in U.S. Appl. No. 15/240,004", dated Sep. 18, 2019, 29 Pages.
"Non Final Office Action Issued in U.S. Appl. No. 15/226,966", dated Oct. 31, 2019, 30 Pages.

* cited by examiner

DETECTION OF BULK OPERATIONS ASSOCIATED WITH REMOTELY STORED CONTENT BY CLIENT DEVICE

CROSS-REFERENCE TO RELATED APPLICATION

This application is a continuation application under 35 U.S.C. § 120 of U.S. patent application Ser. No. 15/230,580 filed on Aug. 8, 2016. The U.S. Patent Application is herein incorporated by reference in its entirety.

BACKGROUND

Increasingly, cloud storage providers are utilized for storing and/or sharing content across multiple clients, where the cloud storage providers have engines that automatically synchronize the content between the clients and cloud storage. However, synchronization may be problematic when a user accidentally deletes a large portion of content and does not realize until a later time when restoration of previous versions of the content becomes a complex and tedious task. Synchronization may also be problematic if a nefarious application has started to delete and/or encrypt a user's data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to detection of bulk operations associated with content stored at a storage service to protect users both proactively and remedially from accidental and/or nefarious modifications of large portions of the content. For example, a storage service may be configured to create a model based on a usage pattern associated with content stored at the storage service. An attempted operation performed on the content may be detected, and the attempted operation may be compared to the model to determine whether the operation deviates from the usage pattern. In response to a determination that the attempted operation deviates from the usage pattern, a preservation policy for the content may be modified and notifications may be provided to obtain approval for execution of the attempted operation.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
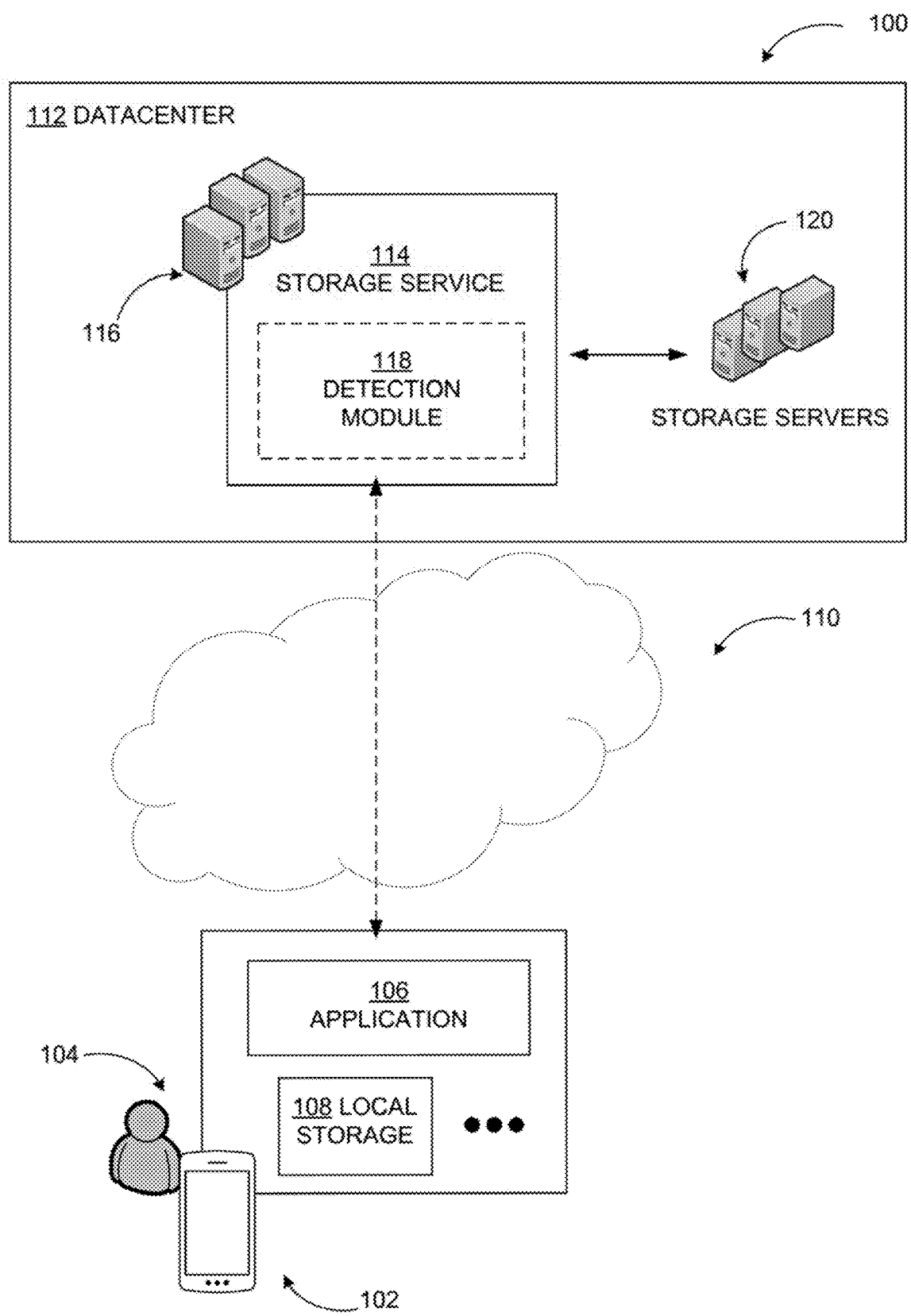
FIG. 1 includes an example network environment where a server-side system to detect bulk operations at a storage service may be implemented.

As briefly described above, embodiments are directed to detection of bulk operations associated with content stored at a storage service to protect users both proactively and remedially from accidental and/or nefarious modifications of large portions of content. The storage service may be configured to create a model based on a usage pattern associated with content stored at the storage service. In some examples, the model may define a change threshold that indicates a maximum amount of the content (based on a type of the content) to be altered within a particular time period based on the usage pattern, such as X files altered within Y seconds. An attempted operation performed on the content may be detected, and the attempted operation may be compared to the model to determine whether the attempted operation deviates from the usage pattern (that is, whether the content altered during the attempted operation exceeds the change threshold). Alternatively, and/or additionally, the amount of content altered may be compared against a total amount of content in the user's account or any other arbitrary signals to determine whether the attempted operation deviates from the usage pattern. If the attempted operation deviates from the usage pattern, a preservation policy for the content may be modified by increasing a frequency for versioning of the content, increasing a number of previous versions of the content preserved at the storage service, and/or increasing a time frame for preservation of the previous versions of the content at the storage service, for example. Additionally, the user may be notified of the attempted operation and asked to approve or reject the execution of the attempted operation in order to proactively prevent accidental and/or nefarious alteration of the content. Moreover, if the attempted operation is executed, following user approval or by error, the user may be provided a restoration option that enables a previous version of the content to be restored as a remedial measure in the event that the operation is accidental and/or nefarious.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a of memory, a hard drive, a flash drive, a floppy disk, or a compact disk, and comparable hardware media.

Throughout this specification, the term "platform" may be a combination of software and hardware components for detecting bulk operations associated with content stored at a storage service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a server-side system to detect bulk operations at a storage service may be implemented.

As illustrated in diagram 100, an example system may include a datacenter 112 hosting a cloud-based storage service 114 configured to provide storage for and enable sharing of content that may be accessed across multiple devices and users. The datacenter 112 may include one or more processing servers 116 configured to execute the storage service 114, among other components. In some embodiments, at least one of the processing servers 116 may be operable to execute a detection module 118 of the storage service 114, where the detection module 118 may be integrated with the storage service 114 to detect bulk operations associated with content stored at the storage service 114 to protect users, such as user 104, from accidental and/or nefarious alterations of large portions of the content. In other embodiments, this function may be inherently present within the storage service 114 itself. The datacenter 112 may also include one or more storage servers 120 configured to manage one or more data stores comprising data associated with content stored by the storage service 114 and/or data associated with usage patterns and models created by the detection module 118. As described herein, the storage service 114 and/or detection module 118 may be implemented as software, hardware, or combinations thereof.

In some embodiments, the storage service 114 may be configured to interoperate with various applications to synchronize content stored locally on user associated devices with the same content stored remotely at the storage service 114. For example, as illustrated in the diagram 100, the user 104 may execute a thin (e.g., a web browser) or a thick (e.g., a locally installed client application) version of an application 106 through a device 102 with which the storage service 114 may be configured to integrate and interoperate with over one or more networks, such as network 110. The application 106 may be an application hosted by the storage service, such as a synchronization client, for example. The device 102 may include a desktop computer, a laptop computer, a tablet computer, a vehicle mount computer, a smart phone, or a wearable computing device, among other similar devices. A communication interface may facilitate communication between the storage service 114 and the application 106 over the network 110.

In an example embodiment, the detection module 118 may be configured to create a model based on a usage pattern associated with the content stored at the storage service 114. The usage pattern may be determined based on a type of the content, previous operations performed on the content by the user 104, an account size of the user 104, and a frequency at which the user 104 performed operations on the content, among other examples. The model may define a change threshold based on a type of altered content, an amount of altered content, and an amount of altered content within a particular period that indicates a maximum amount of the content to be altered. For example, the change threshold may be formulated as X content (items, files, or folders, for example) within Y time (seconds, minutes, hours, or days, for example). In an example scenario, if the user 104 is an IT administrator for an organization that is constantly altering large numbers of files for the organization, the model may define a change threshold as 1000 files within 1 second. However, if the user 104 is a team member of the organization that has more limited access to alter files of the organization and tends to alter the files to which he/she has access to at a lower frequency, the model may define the change threshold as 10 files within 1 second. The detection module 118 may store the model and usage pattern in the data stores managed by the storage servers 120 of the storage service 114.

The detection module 118 may detect an attempted operation performed on the content. The operation may be performed at the device 102 for example, and provided to the storage service 114 through a synchronization process via the application 106. The attempted operation may include a deletion of the content, an encryption of the content, and an update of the content, among other types of alterations to the content. The detection module 118 may further detect metadata associated with the attempted operation, such as an amount of the content being altered, a time period between alterations, a count of the content (e.g., modification of existing content vs. newly created content vs. deleted count), a process initiating the alterations, content (particularly file) extensions before and after the alterations, a size of the content before and after the alterations, and a presence of particular signatures. The detection module 118 may retrieve the model from the data stores, and compare the attempted operation to the model, including the metadata, to determine whether the attempted operation deviates from the usage pattern. The attempted operation may deviate from the usage pattern if the content altered during the attempted operation exceeds the change threshold defined by the model. For example, if the change threshold is X content altered within Y time, and during the attempted operation more than X content has been altered within the Y time, then the attempted operation deviates from the usage pattern. Alternatively and/or additionally, the amount of content altered may be compared against a total amount of content in the user's account or any other arbitrary signals to determine whether the attempted operation deviates from the usage pattern. For example, the attempted operation may deviate from the usage pattern if 70% of files have changed in Y seconds.

If the attempted operation does not deviate from the usage pattern, then the operation is likely an intentional one performed by the user 104. Therefore, the operation may be executed and synchronization may be enabled such that the content as altered by the operation may be synchronized between the local storage 108 of the device 102 and the remote data stores of the storage service 114. However, if the attempted operation does deviate from the usage pattern, then the operation may have been accidentally performed by the user 104, may be a result of an attack, or may have just been an unusual but intentional operation performed by the user 104. Therefore, the detection module 118 may be configured to modify a preservation policy for the content at the storage service 114 to mitigate any potential problems that may arise if the operation is indeed accidental and/or nefarious. For example, the detection module 118 may increase a frequency for versioning of the content, increase a number of previous versions of the content preserved at the storage service 114, and/or increase a time frame for preservation of the previous versions of the content at the storage service 114. These modifications to the preservation policy may make restoration of previous versions of the content a much simpler task if the operation is executed and then later realized to be an accident or attack. The detection module 118 may also prevent and/or place a hold on synchronization of the content between the device 102 and storage service 114 to prevent versions of content altered by potentially unintended operations from propagating to the data stores of the storage service 114.

If the attempted operation deviates from the usage pattern, the detection module 118 may also be further configured to provide a notification of the attempted operation to the device 102 for display. The notification may request for the user 104 to approve or reject the execution of the attempted operation in order to proactively prevent accidental and/or nefarious alteration of the content. In some examples, the user 104 may also be prompted to provide authentication to approve the content. If the user approves and provides valid authentication for the approval, the operation may be executed and the hold on synchronization may be removed such that the content as altered by the operation may be synchronized between the local storage 108 of the device 102 and the remote data stores of the storage service 114. Additionally, or alternatively, if the attempted operation deviates from the usage pattern and the operation is executed (either following user approval or due to an error, for example), the detection module 118 may provide a restoration option to the device 102 for display as a remedial measure. For example, the restoration option may enable a previous version of the content preserved at the storage service 114 to be restored in the local storage 108 of the device 102 in the event that the executed operation is accidental and/or nefarious, or the user 104 simply regrets performing the operation. Additionally and/or alternatively, the restoration option may enable a previous version of deleted content from the storage service to be restored at the remote data stores of the storage service 114 and the local storage 108 of the device 102.

Some of the actions and/or processes described herein have been illustrated from the perspective of a server (for example, the processing servers 116 configured to execute the storage service 114), however the same actions may be performed similarly by a client (for example, the application 106), among other entities.

As previously discussed, cloud storage providers are increasingly utilized for storing and/or sharing content across multiple clients, where the cloud storage providers have engines that automatically synchronize the content between the clients and cloud storage. Complaints are frequently received that the cloud storage providers are accidentally deleting files in the cloud via unintended actions on the clients. Often when the user accidentally deletes a large portion of content and does not realize until a later time, restoration of previous versions of the content becomes a complex and tedious task. Moreover, attackers may take advantage of this vulnerability by deleting and/or encrypting content and having it replicate to the cloud and other devices. Conventionally, a cloud storage provider may have a delete notification over email system to provide a notification to a user when a large number of file deletes are detected, for example. The notification may prompt the user to look in the recycle bin and restore the files if the user so desires. However, the preservation policy of the content at the storage service is not modified and thus, restore points are not created that easily allow users to go back in time to find a previous version of the content to restore. Moreover, the delete notification over email system is not proactive as it does not detect and/or prevent the attempted operation from executing.

Therefore, embodiments are directed to detection of bulk operations associated with content stored at a storage service to protect users both proactively and remedially from accidental and/or nefarious modifications of the content, which improves security of content stored both locally at the device and remotely at the storage service. First, attempted bulk operations that could be destructive to the user's data may be detected and put on hold until the user approves or rejects execution of the operations in order to proactively protect the user. Second, once the operations have been executed (either following approval or if by error), a notification may be provided that enables user selection of an option to restore their content to a point in time before the bulk activity occurred in order to remedially protect the user. In addition to security improvements, user interactivity may be increased by enabling users to approve or reject execution of the operations and/or to select a restoration option, which may also enhance reliability by ensuring that no accidental or nefarious operations are executed, and even if they are, restoration of previous content versions is possible. Moreover, by placing holds on potentially unintended bulk operations and synchronization, processor and memory usage may be reduced when only approved versus all bulk operations are executed and subsequently synchronized.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at individual devices and remotely at cloud-based storage services.

Figure 2:
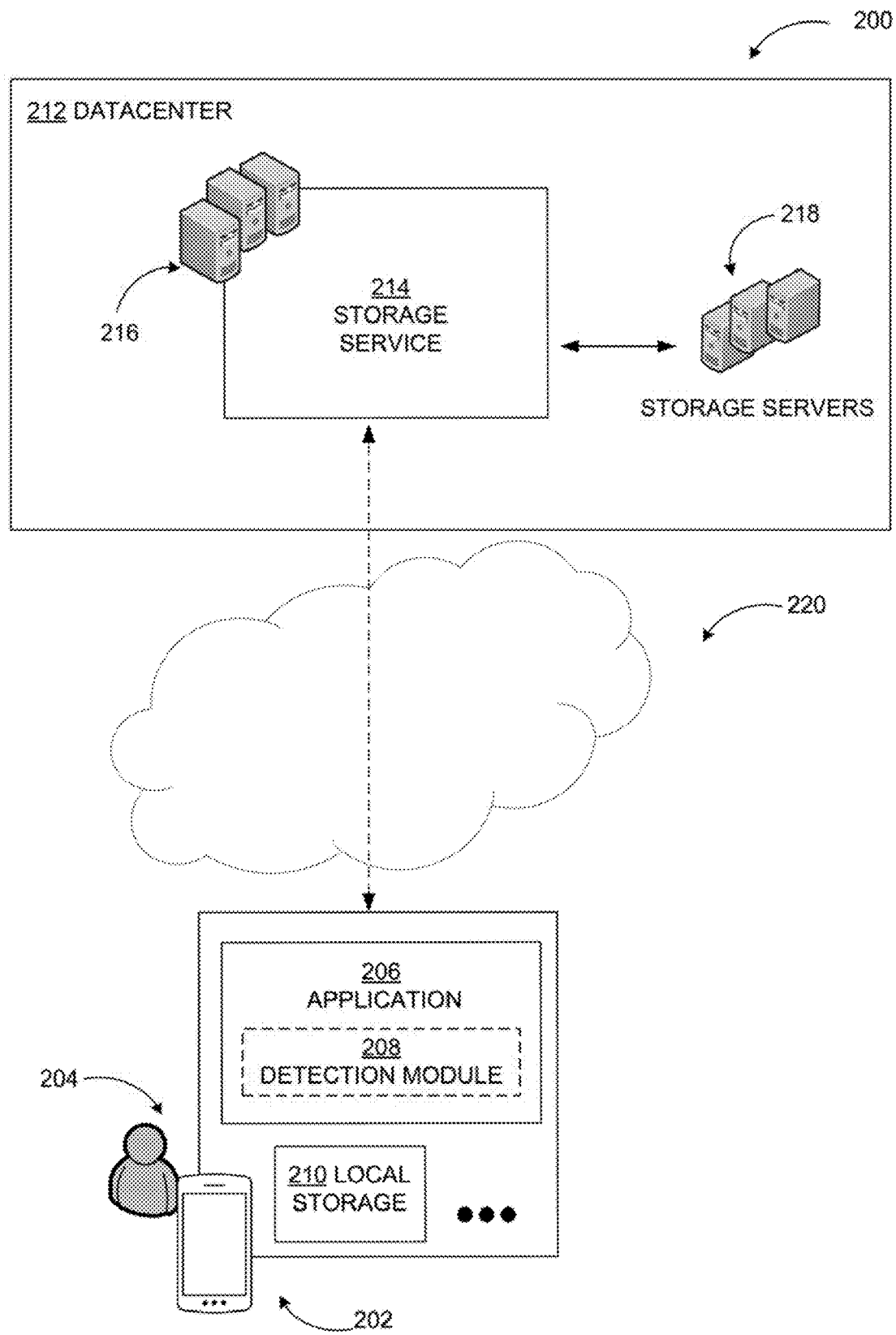
FIG. 2 includes another example network environment where a client-side system to detect bulk operations at a storage service may be implemented.

FIG. 2 includes another example network environment where a client-side system to detect bulk operations at a storage service may be implemented.

As illustrated in diagram 200, a user 204 may execute a thin (e.g., a web browser) or a thick (e.g., a locally installed client application) version of an application 206 (e.g., a synchronization client) through a device 202. A cloud-based storage service 214 executed by at least one or more processing servers 216 of a datacenter 212 may be configured to interact with the application 206 over one or more networks, such as network 220. For example, the storage service 214 may be configured to synchronize content stored within a local storage 210 of the device 202 via the application 206 for remote storage at data stores managed by one or more storage servers 218 of the storage service 214. A communication interface may facilitate communication between the storage service 214 and the application 206 over the network 220. The application 206 may include, among other components, a detection module 208 configured to detect bulk operations associated with the content to protect the user 204 from accidental and/or nefarious alterations of large portions of the content. In other embodiments, this function may be inherently present within the application 206 itself.

In an example embodiment, the detection module 208 may be configured to monitor a usage pattern associated with content stored locally on the device 202. For example, the detection module 208 may monitor operations performed on the content by the user 204, an account size of the user 204, and a frequency at which the user 204 performs operations on the content, among other examples. The usage pattern may be stored locally at local storage 210 of the device 202. In one example, the usage pattern may be provided to the storage service 214, and the detection module 208 may receive a model created by the storage service 214 based on the usage pattern that defines a change threshold based on a type of altered content, an amount of altered content, and an amount of altered content within a particular period. The received model may be stored locally at local storage 210 of the device. In another example, the detection module 208 itself may be configured to define the change threshold indicating the maximum amount of the content to be altered within the particular time period based on the usage pattern.

The detection module 208 may be configured to detect an attempted operation performed on the content through the device 202. The attempted operation may include a deletion of the content, an encryption of the content, and an update of the content, among other types of alterations to the content. The detection module 208 may retrieve the model from the local storage 210 and compare the model to the attempted operation and/or may compare the change threshold to a type of altered content, an amount of altered content, and/or an amount of altered content within the particular period during the attempted operation. In response to a determination that the content altered during the attempted operation does not exceed the change threshold defined by the model or by the detection module 208, execution of the operation may be enabled. Following execution of the operation, the content, as altered by the operation, may be synchronized between the device 202 and the storage service 214. In response to a determination that the change threshold is exceeded, the detection module 208 may be configured to prevent execution of the attempted operation until the operation is approved. Additionally, the detection module 208 may be configured to prevent synchronization of content between the device 202 and the storage service 214.

For example, the detection module may present a notification of the attempted operation through a display of the device 202, where the user 204 is enabled to approve or reject the attempted operation through the notification. In some embodiments, the user 204 may also be prompted to provide authentication through the notification in order to approve the operation. The authentication may include a combination of an identification and a password or a credential, among other types of authentication mechanisms. If the user 204 approves the attempted operation, the detection module 208 may be configured to enable execution of the operation, and upon execution of the operation, enable the content to be synchronized between the device 202 and the storage service 214. If the user 204 rejects the attempted operation, the attempted operation will not be executed to proactively prevent the accidental and/or nefarious alteration of the content not intended by the user 204.

In further embodiments, if the operation is executed following approval and/or by error, for example, the detection module 208 may also present a selectable restoration option through the display of the device 202. The restoration option may enable the user to restore a previous version of the content (preserved at the storage service 214 in response to the modification of the preservation policy) to the local storage 210 of the device 202. The restoration option may serve as a remedial measure to accidental and/or nefarious alteration of the content, as well as a general opportunity for the user 204 to change his/her mind about operations performed. In an alternate embodiment, both the notification and restoration option may be provided and the ability to approve/reject the attempted operation and restore the previous version of the content may occur on different clients than the client which initially synchronized the content between the device 202 and the storage service 202.

Some of the actions and/or processes described herein have been illustrated from the perspective of a client (for example, application 206 executing on device 202), however the same actions may be performed similarly by a server (for example, the processing servers 216 configured to execute the storage service 214), among other entities.

Figure 3:
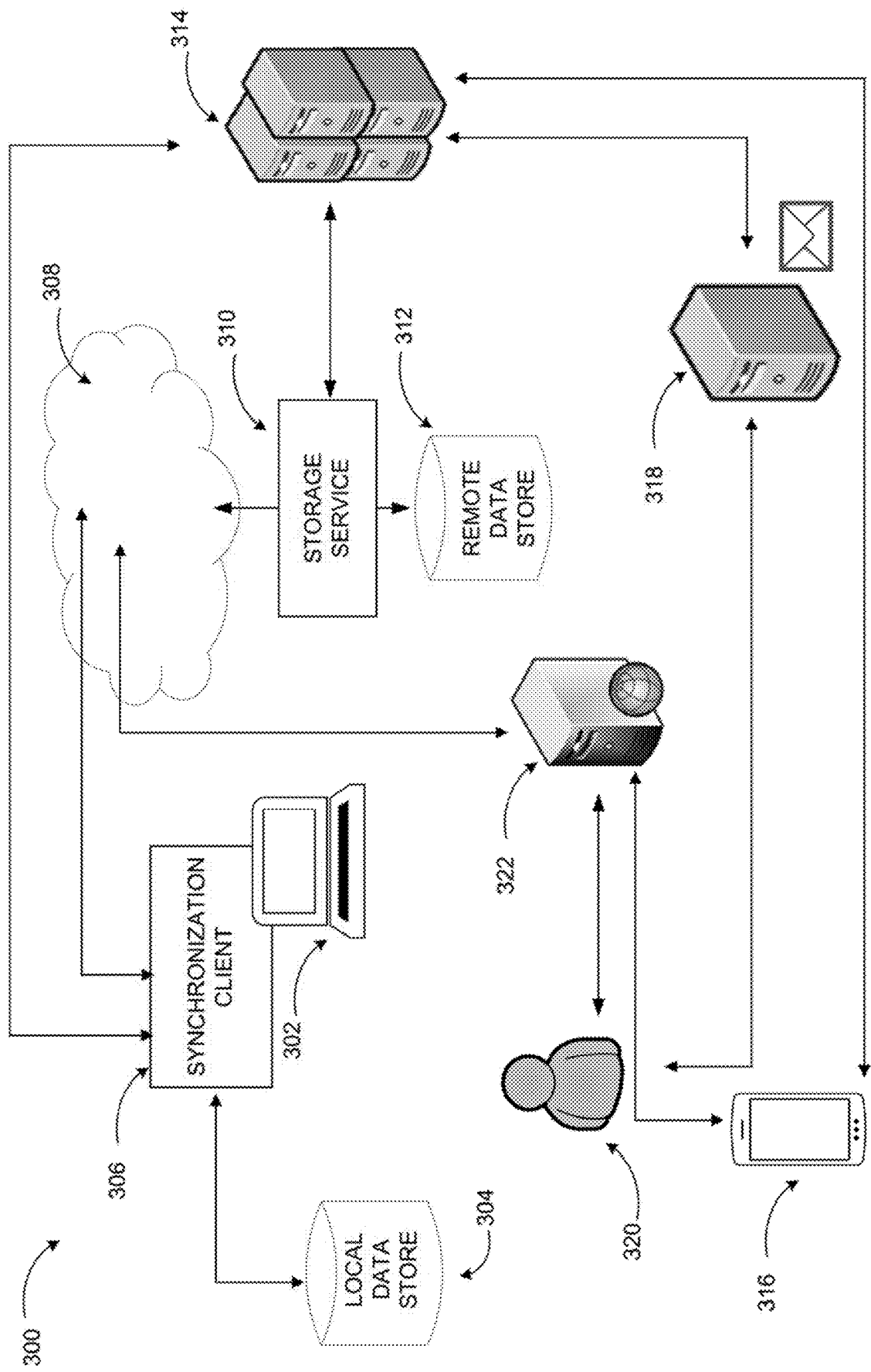
FIG. 3 includes a conceptual diagram illustrating an example process for detection of bulk operation at a storage service.

FIG. 3 includes a conceptual diagram illustrating an example process for detection of bulk operation at a storage service.

As shown in a diagram 300, a cloud-based storage service 310 may be configured to store content in a remote data store 312 associated with the storage service 310. In some embodiments, the storage service 310 may be configured to integrate and interoperate with a synchronization client 306 executing on a device 302, to enable periodic synchronization between content stored at a local data store 304 of the device 302 and content stored at the remote data store 312, over one or more networks 308. For example, content may be downloaded from the storage service 310 to be stored at the local data store 304 of the device 302 and/or content from the device 302 may be uploaded to the storage service 310 and stored in the remote data store 312 based on one or more rules. Synchronization may ensure that the most updated content is stored both locally at the device 302 and remotely at the storage service 310.

Additionally, the storage service 310 (and/or in other embodiments, the synchronization client 306) may be configured to detect bulk operations associated with content stored at the remote data store 312 to protect users, such as user 320 associated with the device 302, from accidental and/or nefarious alterations of large portions of the content.

For example, processing servers 314 associated with the storage service 310 may be configured to create a model based on a usage pattern associated with the content stored at the remote data store 312. In some examples, the usage pattern associated with the content may be monitored and/or provided by the synchronization client 306. The usage pattern may be determined based on a type of the content, previous operations performed on the content by the user 320, an account size of the user 320, and a frequency at which the user 320 performed operations on the content, among other examples. The model may define a change threshold based on a type of altered content, an amount of altered content, and an amount of altered content within a particular period that indicates a maximum amount of the content to be altered. For example, the change threshold may be formulated as X content (items, files, or folders, for example) within Y time (seconds, minutes, hours, or days, for example) and/or a percentage of content (based on total content) within Y time.

The processing servers 314 may detect an attempted operation performed on the content. The attempted operation may be performed at the device 302, for example, and provided to the storage service 310 via the synchronization client 306. In addition, metadata associated with the attempted operation, such as an amount of the content being altered, a time period between alterations, a count of the content modification of existing content vs. newly created content vs. deleted count), a process initiating the alterations, extensions of the content before and after the alterations, a size of the content before and after the alterations, and a presence of particular signatures may detected. The processing servers 314 may compare the attempted operation to the model, including the metadata, to determine whether the attempted operation deviates from the usage pattern. The attempted operation may deviate from the usage pattern if the type of altered content, the amount of altered content, and/or the amount of altered content within a particular period during the attempted operation exceeds the change threshold defined by the model.

If the attempted operation does not deviate from the usage pattern, then the operation is likely an intentional one performed by the user 320. Therefore, the attempted operation may be executed and synchronization may be enabled such that the content as altered by the operation may be synchronized between the local data store 304 of the device 302 and the remote data store 312 of the storage service 310. However, if the attempted operation does deviate from the usage pattern, then the operation may have been accidentally performed by the user 320, may be a result of an attack, or may just be an unusual but intended operation performed by the user 320. Therefore, the processing servers 314 may be configured to modify a preservation policy for the content at remote data store 312 of the storage service 310 to mitigate any potential problems that may arise if the operation is indeed accidental and/or nefarious. For example, the processing servers 314 may increase a frequency for versioning of the content, increase a number of previous versions of the content preserved in the remote data store 312, and/or increase a time frame for preservation of the previous versions of the content in the remote data store 312, for example. These modifications to the preservation policy may make restoration of previous versions of the content a much simpler task if the attempted operation is executed and then later realized to be an accident or attack. The processing servers 314 may also prevent and/or place a hold on synchronization of the content between the device 302 and storage service 310 to prevent versions of content altered by potentially unintended operations from propagating to the remote data store 312.

The processing servers 314 may be further configured to provide a notification of the attempted operation to the user 320. In one example, the processing servers 314 may provide the notification to the synchronization client 306 for display on the device 302. In another example, the processing servers 314 may provide the notification as a short message service (SMS) to a mobile device 316 of the user 320. In a further example, the processing servers 314 may provide the notification as an email to a communication server 318 associated with the user 320. After receiving the notification, the user may respond to the notification through a web user interface and/or an application executing on an individual server 322 of a user device (such as the device 302 or the mobile device 316), for example. The notification may present the metadata that shows the statistically significant deviation of the attempted operation as compared to the model or threshold, and request for the user 320 to approve or reject the execution of the attempted operation in order to proactively prevent accidental and/or nefarious alteration of the content. In some examples, the user 320 may also be prompted to provide authentication to approve the content.

If the user 320 approves and/or provides valid authentication for the approval, the operation may be executed and the hold that was placed on synchronization may be removed such that the content as altered by the operation may be synchronized between the local data store 304 of the device 302 and the remote data store 312 of the storage service 310. Additionally or alternatively, the processing servers 314 may provide a restoration option for display that enables a previous version of the content stored at the storage service 310 to be restored, at one or more of the remote data store 312 of the storage service 310 and the local data store 304 of the device 302 after the attempted operation has been executed. The restoration option may be provided as a remedial measure enabled by the modified preservation policy in the event that the executed operation is accidental and/or nefarious, or if the user 320 simply changes his/her mind.

Figure 4A:
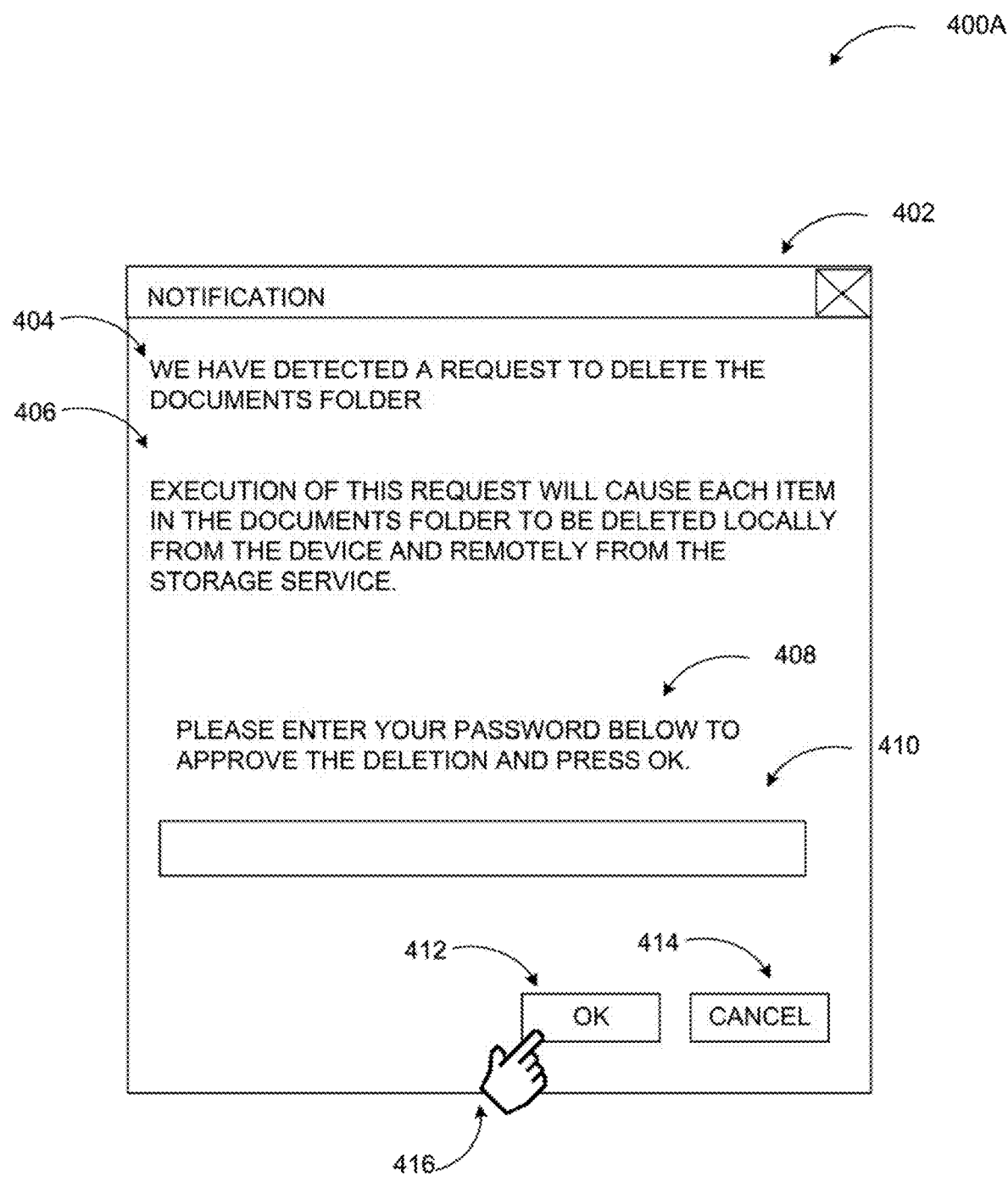
FIGS. 4A-B include example notifications provided in response to a detection and/or execution of a bulk operation at a storage service.
Figure 4B:
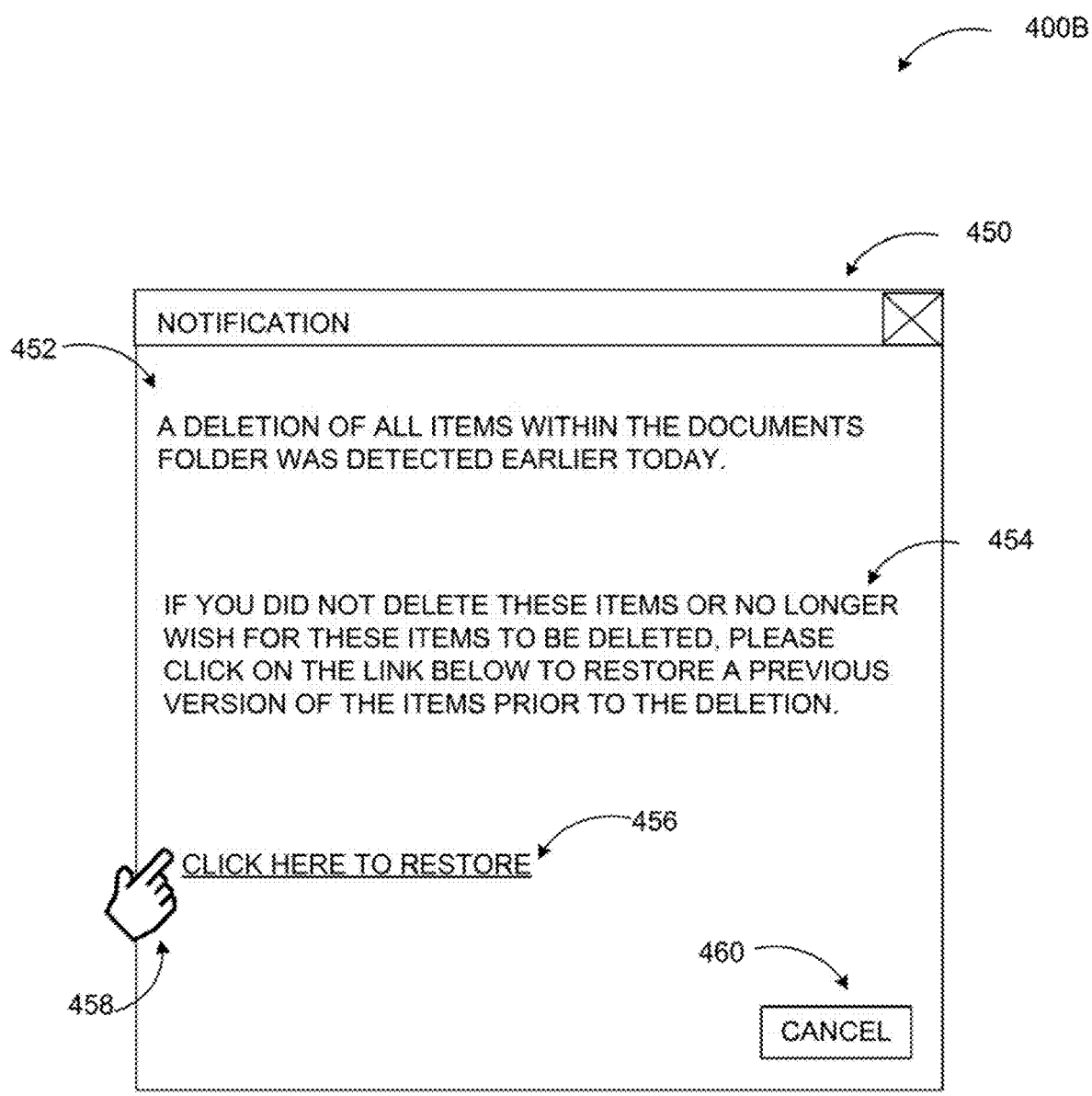

FIGS. 4A-B include example notifications provided in response to a detection and/or execution of a bulk operation at a storage service. A storage service may be configured to detect bulk operations associated with content stored at remote data stores of the storage service to protect users both proactively and remedially from accidental and/or nefarious modifications of large portions of content.

For example, the storage service may be configured to create a model based on a usage pattern associated with content stored at the storage service, where the model may define a change threshold based on a type of altered content, an amount of altered content, and an amount of altered content within a particular period that indicates a maximum amount of the content to be altered. An attempted operation performed on the content may be detected, and the attempted operation may be compared to the model to determine whether the attempted operation deviates from the usage pattern. If the attempted operation deviates from the usage pattern (that is, if the content altered during the attempted operation exceeds the change threshold defined by the model), a preservation policy for the content may be modified by increasing a frequency for versioning of the content, increasing a number of previous versions of the content preserved at the storage service, and/or increasing a time frame for preservation of the previous versions of the content at the storage service, for example. These modifications to the preservation policy may make restoration of previous versions of the content a much simpler task if the operation is executed and then later realized to be an accident or attack.

Additionally, the storage service may provide a notification 402 of the attempted operation to the user, as shown in diagram 400A of FIG. 4A. The notification 402 may be provided to an application associated with the storage service that is executing on the device on which the attempted operation is performed for presentation through a display of the device, for example. Additionally and/or alternatively the notification 402 may be provided as a short message service (SMS) to a mobile device associated with the user or an email message to a communication server associated with the user. The notification 402 may indicate the attempted operation that has been detected 404, explain the effect of the execution of the attempted operation 406, and request the user to approve or reject 408 the execution of the attempted operation in order to proactively prevent accidental and/or nefarious alteration of the content, where user authentication 410 may be required for approval.

For example, the attempted operation may be indicated as a deletion of the entire documents folder from the local storage of the device (e.g., 404), where execution of the attempted operation will cause each item of the documents folder to be deleted locally from the device and remotely from the storage service (e.g., 406). Depending on a type of content being deleted, the notification 402 may further warn about indirect effects of deletion. For example, the content may also be locally stored on other devices of the user or devices of other collaborating users, for example, that are also synchronized with the storage service. As a practical effect, if the user approves the deletion locally and remotely, the content will also be locally deleted from any device comprising the content during a next synchronization process, which may be an effect unintended by the user. In such scenarios, the notification 402 may provide further warnings and/or confirmations given the potential gravity of a universal delete. The notification 402 may request that the user enter a password or credential to approve the deletion of the documents folder (e.g., 408, 410). In response to a user selection 416 of an "OK" command 412 and verification of the user password entered, the deletion may be executed. Alternately, the user may select a "Cancel" command 414 if the user rejects the deletion, in which case the operation will fail.

Moreover, once the attempted operation is executed, either following approval by the user or by an error, the storage service may provide the user a restoration option through a notification 450, as shown in diagram 400B of FIG. 4B, to enable a previous version of the content to be restored as a remedial measure in the event that the operation is accidental and/or nefarious. As previously discussed, once the attempted operation is detected and is determined to deviate from the model, the preservation policy may be modified. Because the modifications may include an increased frequency for versioning of the content, an increased number of previous versions of the content preserved at the storage service, and/or increased time frame for preservation of the previous versions of the content at the storage service (beginning at the point in time the attempted operation was detected), a restoration option may be provided to the user. For example, the notification 450 may indicate the operation that was executed 452, such as a deletion of all items within a documents folder, and an option to restore a previous version of the items prior to the execution of the deletion 454 through selection of a link 456. In response to a user selection 458 of the link 456, the user may be enabled to select one or more of the previous version of the items to restore that have been preserved at the remote data store of the storage service. In response to a user selection of a "Cancel" command 460, for example, the items may remain deleted from the device. Alternatively, a user may select other commands, such as "Okay to delete" or "Operation was valid", among other examples, that have same effect of causing the items to remain deleted from the device. However, the previous versions may still be preserved at the storage service for at least the time fame designated by the modified preservation policy. Accordingly, the user may still be enabled to more easily restore previous versions of the content if desired at a later time.

Figure 5:
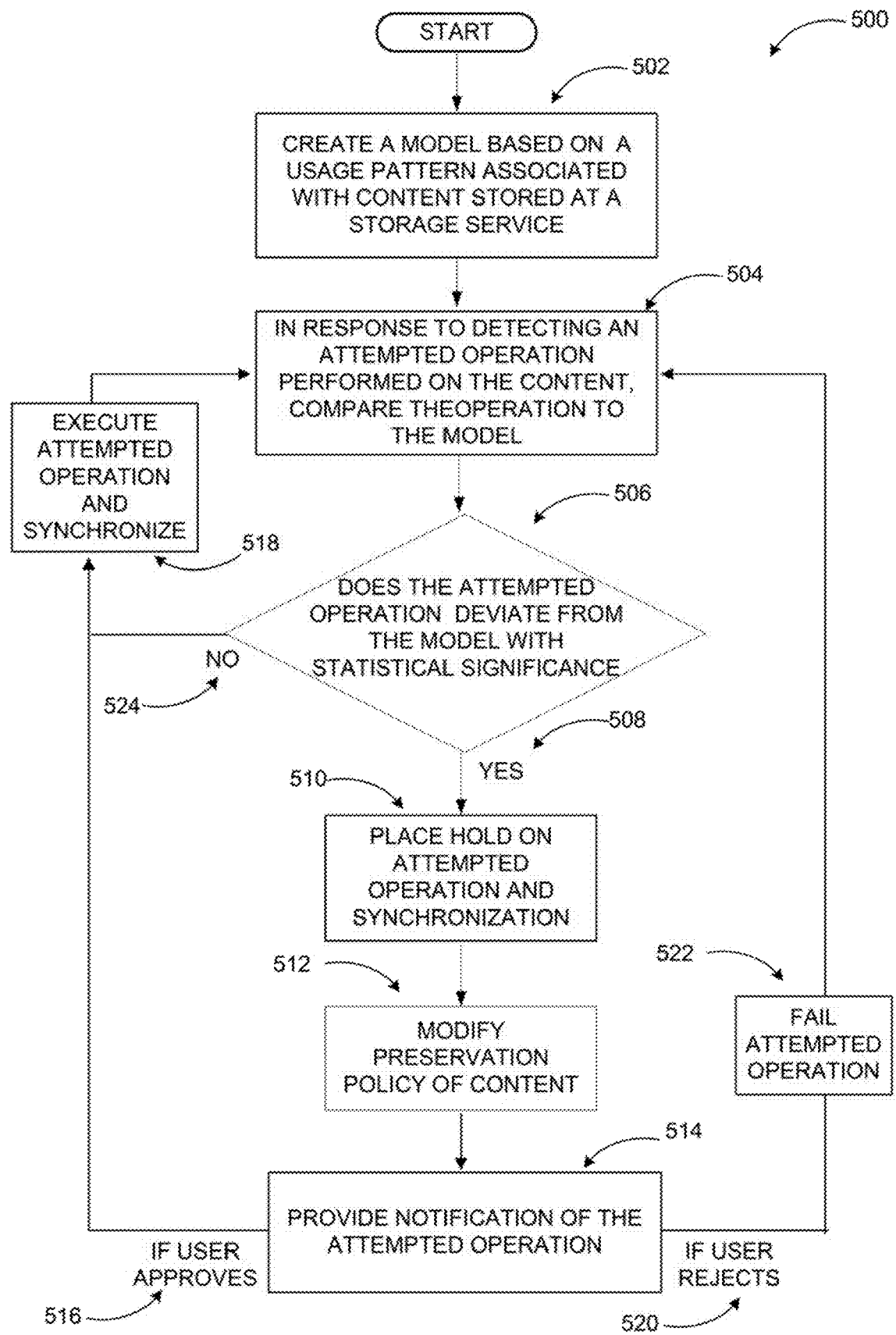
FIG. 5 includes a flow process for detecting a bulk operation at a storage service.

FIG. 5 includes a flow process for detecting a bulk operation at a storage service. A storage service may be configured to interoperate with a synchronization client being executed on a device to automatically synchronize content stored locally on the device with the same content stored remotely at the storage service. The storage service may also be configured to proactively and/or remedially prevent accidental and/or nefarious alteration of the content from being propagated to the storage service and/or device (s) through synchronization.

As shown in a diagram 500, a storage service may be configured to create a model based on a usage pattern associated with the content stored at the storage service 502. The usage pattern may be determined based on a type of the content, previous operations performed on the content by a user of the device, a size of the user's account, and frequency at which the user performed operations on the content, for example. Additionally, the model may be created based on thresholds derived from general trends observed from the user population. In response to detecting an attempted operation performed on the content, the storage service may compare the attempted operation to the model 504. In some embodiments, the storage service may compare the attempted operation to the model 504, in response to detecting multiple attempted operations over a particular period. The attempted operation may include a deletion of the content, an encryption of the content, and an update of the content, among other types of alterations to the content. The storage service may be configured to utilize the comparison to determine whether the attempted operation deviates from the usage pattern 506.

If the attempted operation does deviate from the usage pattern 508, the storage service may place a hold on the attempted operation and synchronization of content between the device and storage service 510, modify a preservation policy for the content at the storage service 512, and provide a notification of the attempted operation to the user through the device 514. The preservation policy may be modified by increasing a frequency for versioning of the content, increasing a number of previous versions of the content preserved at the storage service, and/or increasing a time frame for preservation of the previous versions of the content from the storage service, for example. The notification provided may request for the user to approve or reject the execution of the attempted operation in order to proactively prevent accidental and/or nefarious alteration of the content, where the user may also be prompted to provide authentication to approve. If the user approves 516 the execution of the attempted operation, the hold may be removed to execute the attempted operation and to synchronize 518 the content between the device and the storage service such that such that the content as altered by the operation may be synchronized. The process may then restart at operation 504 in response to another detection of an attempted operation performed on the content. Additionally or alternatively, once the operation is executed, the storage service may provide a restoration option that enables a previous version of the content preserved at the storage service (in response to the modified preservation policy) to be restored at the device as a remedial measure in the event that the executed operation is accidental and/or nefarious. If the user rejects 520 the execution of the attempted operation, the attempted operation may be failed 522 and no synchronization may occur. The process may then restart at operation 504 in response to another detection of an attempted operation performed on the content. In another embodiment, the process may restart at 502, where the model may be updated based on recent user activity, for example.

If the attempted operation does not deviate from the usage pattern 524, the storage service may execute the attempted operation and synchronize 518 the content between the device and the storage service such that such that the content as altered by the operation may be synchronized.

The examples provided in FIGS. 1 through 5 are illustrated with specific systems, services, applications, modules, and notifications. Embodiments are not limited to environments according to these examples. Detection of bulk actions performed on content stored at a storage service may be implemented in environments employing fewer or additional systems, services, applications, modules, and notifications. Furthermore, the example systems, services, applications, modules, and notifications shown in FIGS. 1 through 5 may be implemented in a similar manner with other values using the principles described herein.

Figure 6:
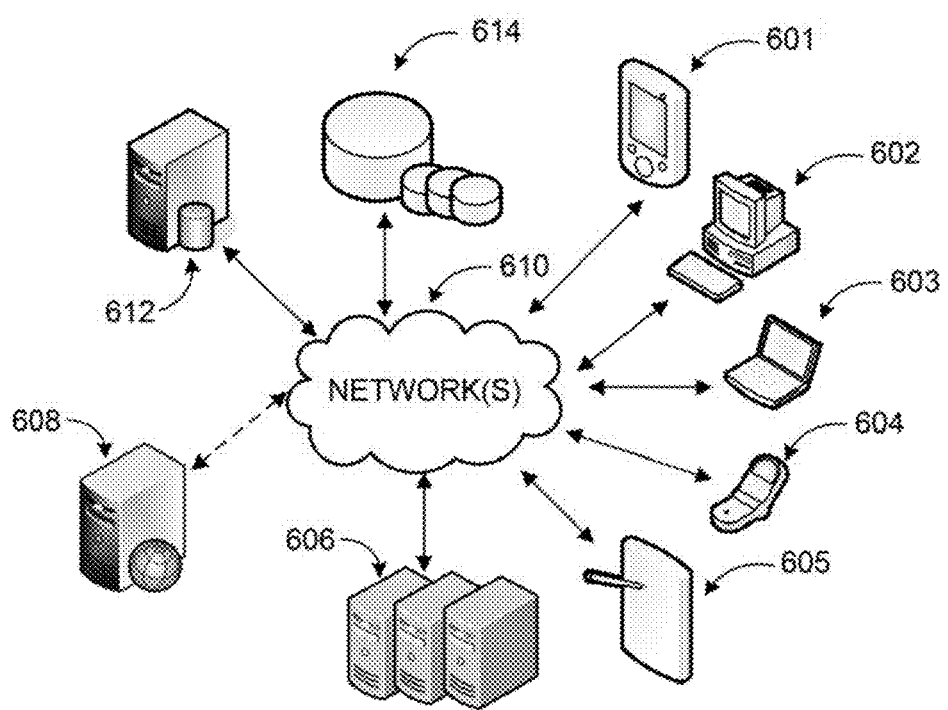
FIG. 6 is a networked environment, where a system according to embodiments may be implemented.

FIG. 6 is a networked environment, where a system according to embodiments may be implemented. In addition to locally installed applications (for example, application 206 or synchronization client 306), a detection module may also be employed in conjunction with hosted applications and services (for example, a storage service 114 or 310) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for detection of bulk operations associated with content stored at a storage service. Furthermore, the networked environments discussed in FIG. 6 are for illustration purposes only. Embodiments are not limited to the example applications, engines, or processes.

Figure 7:
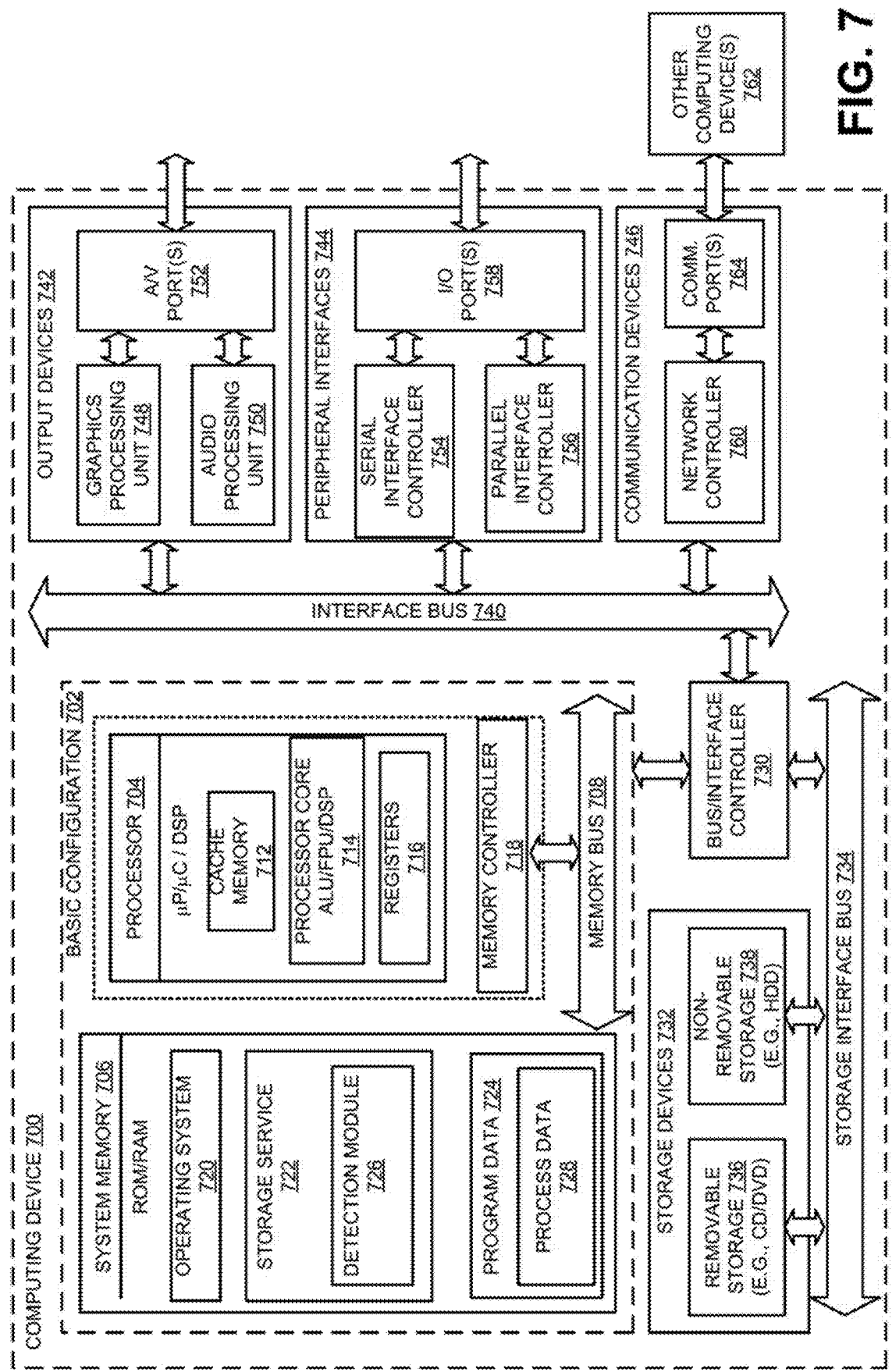
FIG. 7 is a block diagram of an example general purpose computing device, which may be used to detect a bulk operation at a storage service.

FIG. 7 is a block diagram of an example general purpose computing device, which may be used to detect bulk operations at a storage service.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor or any combination thereof. The processor 704 may include one more levels of caching, such as a level cache memory 712, one or more processor cores 714, and registers 716. The example processor, cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system 706 may include an operating system 720, a storage service 722, and program data 724. The storage service 722 may include a detection module 726, which may be an integrated module of the storage service 722. The storage service 72 and/or detection module 726 may be configured to create a model based on a usage pattern associated with content stored at the storage service, detect an attempted operation performed on the content, and compare the attempted operation to the model to determine whether the operation deviates from the usage pattern. In response to a determination that the attempted operation deviates from the usage pattern, the detection module 726 may be configured to modify a preservation policy for the content, and provide a notification of the attempted operation to obtain user approval or rejection for execution of the operation. The program data 724 may include, among other data, process data 728, such as the usage patterns determined to create the model, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few.

Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758, An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to detect bulk operations associated with content stored at a storage service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can automated such as by pre-selected criteria that may be machine automated.

Figure 8:
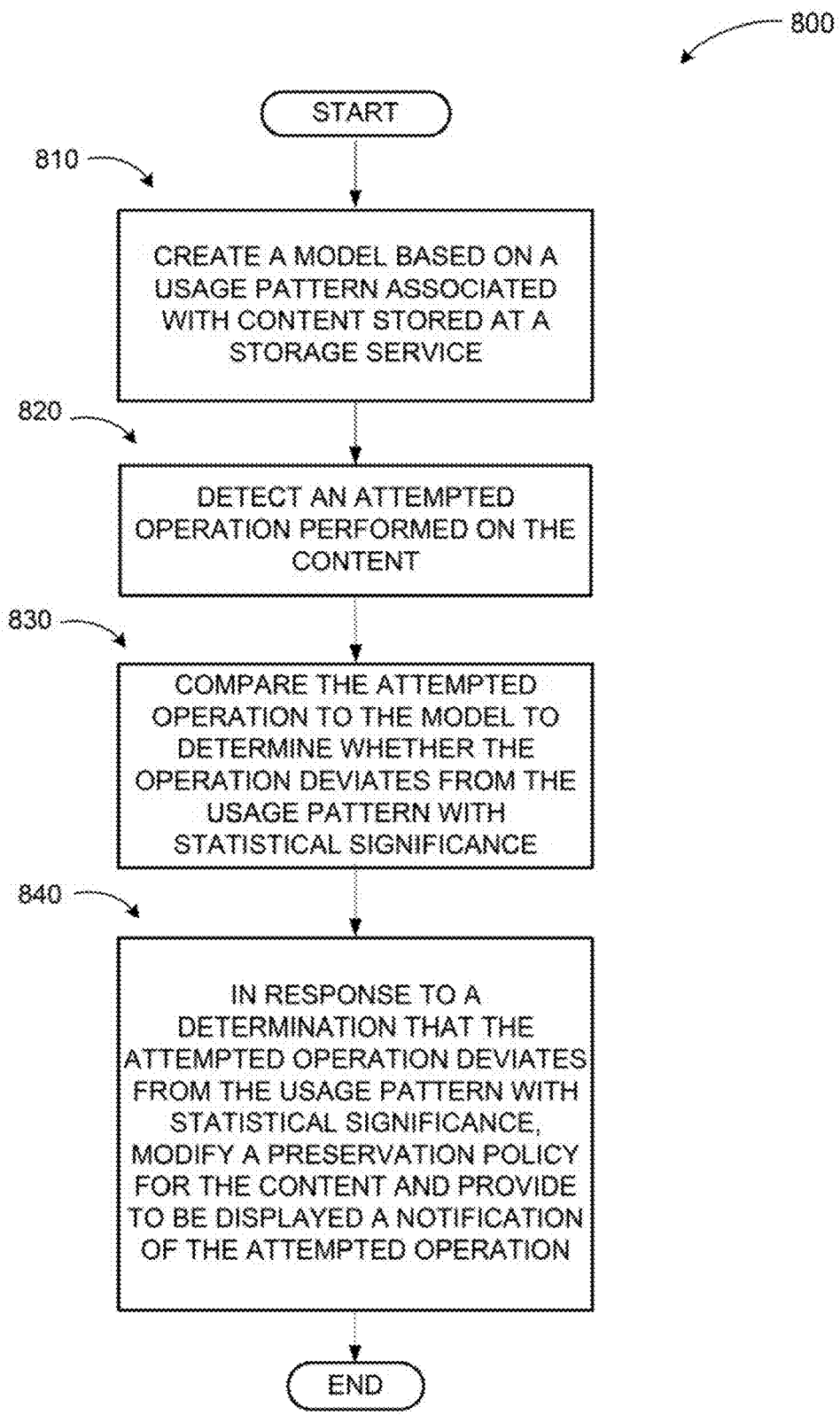
FIG. 8 illustrates a logic flow diagram of a server-side method to detect bulk actions at a storage service.

FIG. 8 illustrates a logic flow diagram of a server-side method to detect bulk operations associated with content stored at a storage service.

Process 800 may be implemented on a computing device, server, or other system. An example system may include a server configured to execute a storage service provided to enable storage and/or sharing of content across multiple devices and user. The server may comprise a communication interface to facilitate communication between the storage service and a device on which the content is stored locally, a memory to store instructions, and one or more processors coupled to the memory. The processors, in conjunction with the instructions stored on the memory, may be configured to detect bulk operations associated with the content.

Process 800 begins with operation 810, where the processors may be configured to create a model based on a usage pattern associated with the content stored at the storage service. In some examples, the model may define a change threshold based on a type of altered content, an amount of altered content, and an amount of altered content within a particular period that indicates a maximum amount of the content to be altered. The usage pattern may be determined based on a type of the content, previous operations associated with the content by a user, a size of the user's account, and frequency at which the user performed operations on the content, for example.

At operation 820, the processors may detect an attempted operation performed on the content. The attempted operation may include a deletion of the content, an encryption of the content, and an update of the content, among other types of alterations to the content. The processors may further detect metadata associated with the attempted operation, such as an amount of the content being altered, a time period between alterations, a count of the content (e.g., modification of existing content vs. newly created content vs. deleted count), a process initiating the alterations, extensions of the content before and after the alterations, a size of the content before and after the alterations, and a presence of particular signatures.

At operation 830, the processors may compare the attempted operation to the model, including the metadata, to determine whether the attempted operation deviates from the usage pattern. The attempted operation may deviate from the usage pattern if the content altered during the attempted operation exceeds the change threshold defined by the model.

At operation 840, the processors may modify a preservation policy for the content at the storage service and provide a notification of the attempted operation for display through the device in response to a determination that the attempted operation deviates from the usage pattern. The processors may modify the preservation policy by increasing a frequency for versioning of the content, increasing a number of previous versions of the content preserved at the storage service, and/or increasing a time frame for preservation of the previous versions of the content from the storage service, for example. The processors may also prevent and/or place a hold on synchronization of the content between the device and storage service. The notification provided may request for the user to approve or reject the execution of the operation in order to proactively prevent accidental and/or nefarious alteration of the content, where the user may also be prompted to provide authentication to approve. If the user approves, the hold on synchronization may be removed. Additionally or alternatively, if the attempted operation deviates from the usage pattern and is executed, the processors may provide a restoration option for display through the device that enables a previous version of the content preserved at the storage service to be restored on the device as a remedial measure in the event that the operation is accidental and/or nefarious.

Figure 9:
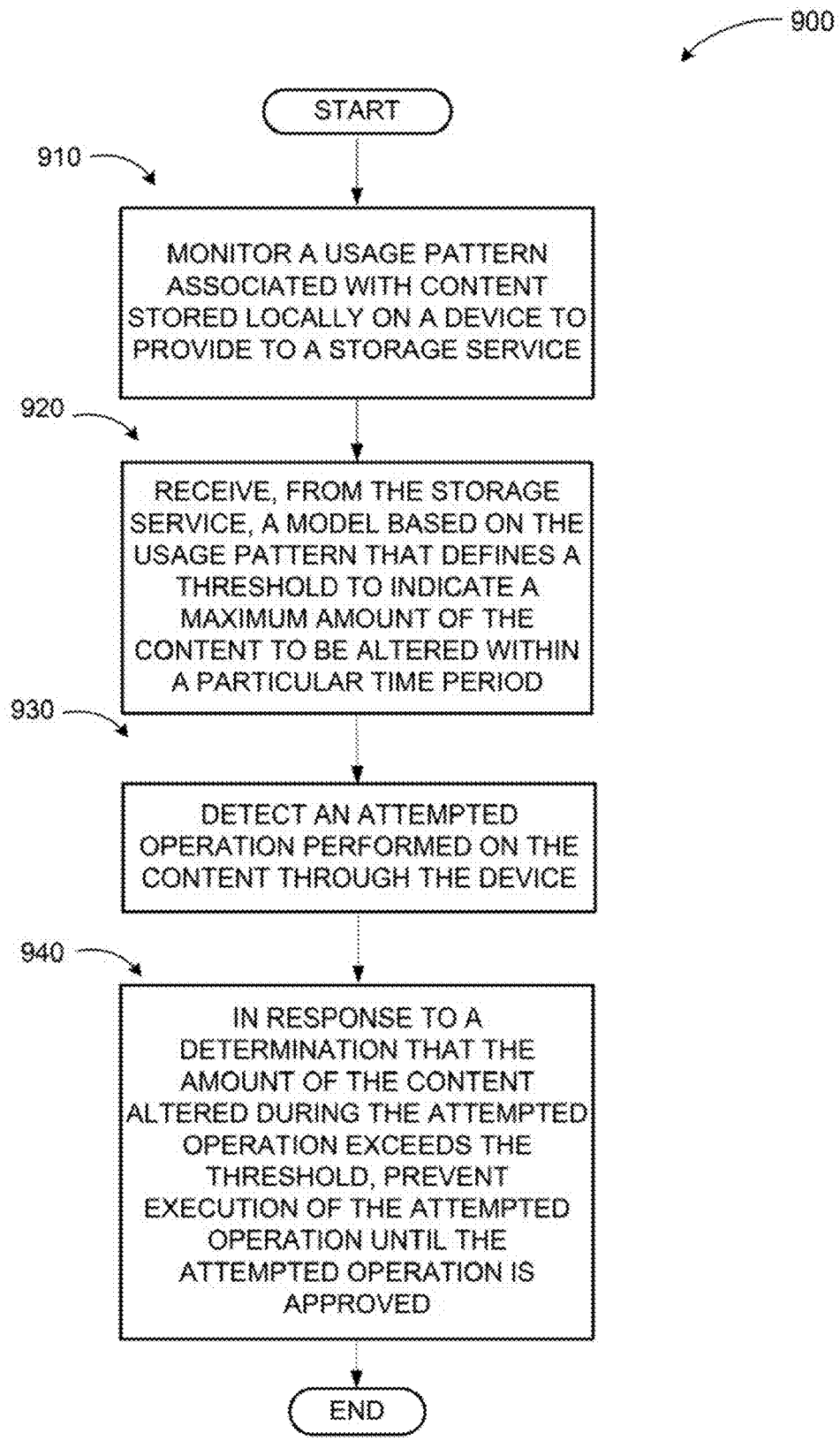
FIG. 9 illustrates a logic flow diagram of a client-side method to detect bulk actions at a storage service, according to embodiments.

The operations included in process 800 are for illustration purposes. Detection of bulk operations associated with content stored at a storage service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples, FIG. 9 illustrates a logic flow diagram of a client-side method to detect bulk operations at a storage service.

Process 900 may be implemented on a computing device, server, or other system, An example system may include a client device comprising a display, a communication interface configured to facilitate communication between the client device and a storage service, a memory configured to store instructions, and one or more processors coupled to the memory. The processors, in conjunction with the instructions stored in the memory, may be configured to detect bulk operations associated with the content.

Process 900 begins with operation 910, where the processors may monitor a usage pattern associated with content stored locally on the client device to provide to the storage service. For example, operations performed on the content by the user, an account size of the user, and a frequency at which the user performs operations on the content may be monitored, among other examples.

At operation 920, the processors may be configured to receive, from the storage service, a model based on the usage pattern that defines a change threshold based on a type of altered content, an amount of altered content, and an amount of altered content within a particular period indicating a maximum amount of the content to be altered. In other embodiments, the processors may be configured to define the change threshold based on the usage pattern and/or based on a total amount of content in the user's account. At operation 930, the processors may be configured to detect an attempted operation performed on the content through the client device. The attempted operation may include a deletion of the content, an encryption of the content, and an update of the content, among other types of alterations to the content.

At operation 940, the processors may be configured to prevent execution of the attempted operation until the operation is, approved in response to a determination that the content altered during the attempted operation exceeds the change threshold. Additionally, the processors may be configured to prevent synchronization of content between the client device and the storage service. For example, the processors may compare the model to the attempted operation and/or the change threshold to the attempted operation to determine whether the content altered during the attempted operation exceeds the change threshold. If the content altered during the attempted operation exceeds the change threshold, the detection module may present a notification of the attempted operation through a display of the client device, where the user is enabled to approve or reject the attempted operation through the notification. If the user approves the attempted operation, the processors may be configured to enable execution of the operation, and upon execution of the operation, enable the content to be synchronized between the device and the storage service. If the user rejects the attempted operation, the attempted operation will not be executed in order to proactively prevent alteration of the content not intended by the user. Alternately, the processors may automatically enable execution of the attempted operation, and subsequent synchronization of the content altered by the operation between the device and the storage service, in response to a determination that the amount of the content altered during the attempted operation does not exceed the change threshold.

The operations included in process 900 are for illustration purposes. Detection of bulk actions performed on content stored at a storage service may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means to detect bulk operations associated with content stored at a storage service may be provided. Example means may include monitoring a usage pattern associated with the content that is stored locally to provide to the storage service, and receiving, from the storage service, a model based on the usage pattern. Example means may also include detecting an attempted operation performed on the content, comparing the attempted operation to the model to determine whether the operation deviates from the usage pattern, and in response to a determination that the attempted operation deviates from the usage pattern, preventing execution of the attempted operation and synchronization of the content with the storage service until the attempted operation is approved.

According to some examples, methods to detect bulk operations associated with content stored at a storage service may be provided. An example method may include monitoring a usage pattern associated with the content that is stored locally to provide to the storage service, and receiving, from the storage service, a model based on the usage pattern. The example method may also include detecting an attempted operation performed on the content, comparing the attempted operation to the model to determine whether the operation deviates from the usage pattern, and in response to a determination that the attempted operation deviates from the usage pattern, preventing execution of the attempted operation and synchronization of the content with the storage service until the attempted operation is approved.

In other examples, execution of the attempted operation and synchronization of the content with the storage service may be enabled in response to a determination that the attempted operation does not deviate from the usage pattern. A notification of the attempted operation may be presented through a display in response to the determination that the attempted operation deviates from the usage pattern. A previous version of the content preserved at the storage service may be enabled to be restored. A restoration option may be presented through a display, where a user may be enabled to select the restoration option to restore the previous version of the content preserved at the storage service.

In further examples, the usage pattern associated with the content may be determined based on previous operations performed on the content by a user, a size of the user's account, and a frequency at which the user performed operations on the content. The model may define a change threshold based on one or more of a type of altered content, an amount of altered content, and an amount of altered content within a particular period. Comparing the attempted operation to the model to determine whether the attempted operation deviates from the usage pattern may include determining whether the change threshold is exceeded during the attempted operation.

According to some embodiments, client devices configured to detect bulk operations associated with content stored at a storage service may be described. An example client device may include a communication interface configured to facilitate communication between the storage service and the client device, a memory configured to store instructions, and one or more processors coupled to the memory. The processors, in conjunction with the instructions stored in the memory, may be configured to monitor a usage pattern associated with the content that is stored locally on the client device to provide to the storage service, and receive, from the storage service, a model based on the usage pattern that defines a change threshold based on one or more of a type of altered content, an amount of altered content, and an amount of altered content within a particular period. The processors may also be configured to detect an attempted operation performed on the content through the client device; and in response to a determination that the type of altered content, the amount of altered content, and/or the amount of altered content within the particular period during the attempted operation exceeds the change threshold, prevent execution of the attempted operation and synchronization of the content with the storage service until the attempted operation is approved.

In other embodiments, the attempted operation may be a creation, a deletion, an encryption, or an update performed on the content. The change threshold may be a static, learned, or calculated value based on previous operations performed on the content by a user, a size of the user's account, and frequency at which the user performed operations on the content. The notification may request for a user to approve or reject the attempted operation. Execution of the attempted operation and the synchronization process may be enabled if the user approves the attempted operation. The attempted operation may be failed if the user rejects the attempted operation. A selectable restoration option may be presented through a display of the client device, where the restoration option may enable a previous version of the content preserved at the storage service to be restored to the client device.

According to some examples, methods to detect bulk operations associated with content stored at a storage service are provided. An example method may include monitoring a usage pattern associated with the content that is stored locally, and defining a change threshold based on one or more of a type of altered content, an amount of altered content, and an amount of altered content within a particular period. The method may also include detecting an attempted operation performed on the content, and in response to a determination that the type of altered content, the amount of altered content, and/or the amount of altered content within the particular period during the attempted operation exceeds the change threshold, preventing execution of the attempted operation and synchronization of the content with the storage service until the operation is approved.

In other examples, a notification of the attempted operation may be presented through a display. The user may be enabled to approve or reject the attempted operation through the notification. The user may be prompted to provide authentication through the notification in order to approve the attempted operation. In response to an execution of the attempted operation, a restoration option may be presented through a display. A user may be enabled to select the restoration option to restore a previous version of the content preserved at the storage service. Synchronization of the content with the storage service may be enabled if the attempted operation is executed such that the content as altered by the operation is synchronized.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to detect bulk operations associated with content stored at a storage service, the method comprising:
monitoring a usage pattern associated with the content that is stored locally to provide to the storage service;
receiving, from the storage service, a model based on the usage pattern, the model defining a change threshold based on one or more of a type of altered content, an amount of altered content, and an amount of altered content within a particular period;
detecting an attempted operation performed on the content;
comparing the attempted operation to the model to determine whether the operation deviates from the usage pattern; and
in response to a determination that the attempted operation exceeds the change threshold, preventing execution of the attempted operation and synchronization of the content with the storage service until the attempted operation is approved.

2. The method of claim 1 further comprising: in response to a determination that the attempted operation does not exceed the change threshold, enabling execution of the attempted operation and synchronization of the content with the storage service.

3. The method of claim 1, further comprising: in response to the determination that the attempted operation exceeds the change threshold, presenting a notification of the attempted operation through a display.

4. The method of claim 1, further comprising: enabling a previous version of the content preserved at the storage service to be restored.

5. The method of claim 4, further comprising: presenting a restoration option through a display, wherein a user is enabled to select the restoration option to restore the previous version of the content preserved at the storage service.

6. The method of claim 1, further comprising: determining the usage pattern associated with the content based on previous operations performed on the content by a user, a size of the user's account, and a frequency at which the user performed operations on the content.

7. A client device configured to detect bulk operations associated with content stored at a storage service, the client device comprising:
- a communication interface configured to facilitate communication between the storage service and the client device;
- a memory configured to store instructions; and
- one or more processors coupled to the memory, wherein the one or more processors, in conjunction with the instructions stored in the memory, are configured to:
  - monitor a usage pattern associated with the content that is stored locally on the client device to provide to the storage service;
  - receive, from the storage service, a model based on the usage pattern that defines a change threshold based on one or more of a type of altered content, an amount of altered content, and an amount of altered content within a particular period;
  - detect an attempted operation performed on the content through the client device; and
  - in response to a determination that the type of altered content, the amount of altered content, and/or the amount of altered content within the particular period during the attempted operation exceeds the change threshold, prevent execution of the attempted operation and synchronization of the content with the storage service until the attempted operation is approved.

8. The client device of claim 7, wherein the attempted operation is one of a creation, a deletion, an encryption, and an update performed on the content.

9. The client device of claim 7, wherein the change threshold is one of a static, learned, or calculated value based on previous operations performed on the content by a user, a size of the user's account, and frequency at which the user performed operations on the content.

10. The client device of claim 7, wherein the notification requests for a user to one of approve or reject the attempted operation, and the one or more processors are configured to: enable execution of the attempted operation and the synchronization process if the user approves the attempted operation; and fail the attempted operation if the user rejects the attempted operation.

11. The client device of claim 10, wherein the one or more processors are configured to: present a selectable restoration option through a display of the client device, wherein the restoration option enables a previous version of the content preserved at the storage service to be restored to the client device.

12. A method to detect bulk operations associated with content stored at a storage service, the method comprising:
- monitoring a usage pattern associated with the content that is stored locally;
- defining a change threshold based on one or more of a type of altered content, an amount of altered content, and an amount of altered content within a particular period;
- detecting an attempted operation performed on the content; and
- in response to a determination that the type of altered content, the amount of altered content, and/or the amount of altered content within the particular period during the attempted operation exceeds the change threshold, preventing execution of the attempted operation and synchronization of the content with the storage service until the operation is approved.

13. The method of claim 12, further comprising: presenting a notification of the attempted operation through a display.

14. The method of claim 13, further comprising: enabling the user to approve or reject the attempted operation through the notification.

15. The method of claim 14, further comprising: prompting the user to provide authentication through the notification in order to approve the attempted operation.

16. The method of claim 12, further comprising: in response to an execution of the attempted operation, presenting a restoration option through a display.

17. The method of claim 16, further comprising: enabling a user to select the restoration option to restore a previous version of the content preserved at the storage service.

18. The method of claim 12, further comprising: enabling synchronization of the content with the storage service if the attempted operation is executed such that the content as altered by the operation is synchronized.

* * * * *